(12) United States Patent
Griffin et al.

(10) Patent No.: US 11,122,136 B2
(45) Date of Patent: Sep. 14, 2021

(54) QUANTUM PAYLOAD SERVICE FOR FACILITATING COMMUNICATIONS BETWEEN A QUANTUM COMPUTING SYSTEM AND CLASSICAL COMPUTING SYSTEMS

(71) Applicant: Red Hat, Inc., Raleigh, NC (US)

(72) Inventors: Leigh Griffin, Waterford City (IE); Luigi Zuccarelli, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 114 days.

(21) Appl. No.: 16/166,672

(22) Filed: Oct. 22, 2018

(65) Prior Publication Data
US 2020/0128063 A1    Apr. 23, 2020

(51) Int. Cl.
*H04L 29/08* (2006.01)
*G06F 9/38* (2018.01)
(Continued)

(52) U.S. Cl.
CPC ........ *H04L 67/2814* (2013.01); *G06F 9/3877* (2013.01); *G06F 9/5027* (2013.01);
(Continued)

(58) Field of Classification Search
CPC ... H04L 67/2814; H04L 67/289; H04L 67/02; H04L 69/22; G06N 10/00; G06F 9/3877; G06F 9/5027; G06F 15/16
See application file for complete search history.

(56) References Cited

U.S. PATENT DOCUMENTS 7,085,814 B1 *   8/2006   Gandhi ............... H04L 29/1232
                                                              709/208
7,853,011 B2    12/2010   Kuang et al.
(Continued)

FOREIGN PATENT DOCUMENTS

CN        104022947 A    9/2014
CN        108365955 A    8/2018
(Continued)

OTHER PUBLICATIONS

Gyongyosi, Laszlo, et al., "A Survey on Quantum Channel Capacities," IEEE Communications Surveys and tutorials. vol. 20, Issue 2, Second Quarter 2018, pp. 1149-1204 (Year: 2018).*
(Continued)

*Primary Examiner* — Patrice L Winder
*Assistant Examiner* — Lam H Duong
(74) *Attorney, Agent, or Firm* — Withrow & Terranova, PLLC (57) ABSTRACT

A quantum payload service for facilitating communications between a quantum computing system and classical computing systems is provided. A payload service in a quantum computing system that offers a plurality of different quantum services receives a message from a classical computing system that is destined for a first quantum service. The message includes a header and a payload. The payload service determines, from the header, an originator address and a destination quantum service identifier that identifies the first quantum service. The payload service extracts, from the message, the payload, and sends the payload, the originator address and the destination quantum service identifier to a quantum channel router of the quantum computing system for delivery of the payload to the first quantum service.

18 Claims, 10 Drawing Sheets

(51) Int. Cl.
  *G06F 9/50*     (2006.01)
  *G06F 15/16*    (2006.01)
  *G06N 10/00*    (2019.01)

(52) U.S. Cl.
  CPC ............ *G06F 15/16* (2013.01); *G06N 10/00* (2019.01); *H04L 67/02* (2013.01); *H04L 67/289* (2013.01)

(56) References Cited

U.S. PATENT DOCUMENTS

| | | | |
|---|---|---|---|
| 9,195,980 B2 | 11/2015 | Puura et al. | |
| 9,495,644 B2 | 11/2016 | Chudak et al. | |
| 9,838,141 B2 | 12/2017 | Martin | |
| 9,847,913 B2 | 12/2017 | Kanda et al. | |
| 9,870,273 B2* | 1/2018 | Dadashikelayeh | G06N 10/00 |
| 10,187,205 B2 | 1/2019 | Guinnard et al. | |
| 10,552,120 B1* | 2/2020 | Vakili | G06F 7/588 |
| 2009/0063686 A1* | 3/2009 | Schmidt | H04L 67/16 709/227 |
| 2010/0332592 A1* | 12/2010 | Hamada | H04L 61/303 709/203 |
| 2011/0047292 A1* | 2/2011 | Gould | H04L 61/302 709/242 |
| 2016/0071021 A1 | 3/2016 | Raymond | |
| 2016/0150043 A1* | 5/2016 | Petronic | H04L 67/2814 709/220 |
| 2016/0267032 A1* | 9/2016 | Rigetti | G06F 13/36 |
| 2017/0272174 A1 | 9/2017 | Brandenburger et al. | |
| 2017/0357539 A1* | 12/2017 | Dadashikelayeh | G06F 9/5083 |
| 2018/0091440 A1 | 3/2018 | Dadashikelayeh et al. | |
| 2018/0144262 A1 | 5/2018 | Roetteler et al. | |
| 2018/0152295 A1* | 5/2018 | Drost | H04L 9/0855 |
| 2018/0307988 A1* | 10/2018 | Fano | G06N 10/00 |
| 2020/0014619 A1* | 1/2020 | Shelar | H04L 45/302 |
| 2020/0027029 A1* | 1/2020 | Linvill | G06N 7/00 |

FOREIGN PATENT DOCUMENTS

| | | |
|---|---|---|
| WO | 2017127850 A1 | 7/2017 |
| WO | 2018111242 A1 | 6/2018 |

OTHER PUBLICATIONS

Lee, Chris, "New form of qubit control may yield longer computation times," Ars Technica, Jan. 26, 2018, WIRED Media Group, 5 pages.

Author Unknown, "Hash Based Quantum Key Two Server Password Authentication," Chapter 5, Published at least as early as Jul. 12, 2018, 19 pages.

Kollmitzer, Christian, et al., "Applied Quantum Cryptography," Lecture Notes in Physics 797, 2010, Springer-Verlag Berlin Heidelberg, 227 pages.

Trung, Truong, "Quantum Information System and the Security of Communication," Apr. 2014, pp. 115-121.

Chong, Frederic, et al., "Programming languages and compiler design for realistic quantum hardware," Nature, vol. 549, Sep. 14, 2017, Macmillan Publishers Limited, 8 pages.

Gyongyosi, Laszlo, et al., "A Survey on Quantum Channel Capacities," IEEE Communications Surveys and Tutorials, vol. 20, Issue 2, Second Quarter 2018, pp. 1149-1204.

King, Christopher, et al., "Capacity of quantum channels using product measurements," Journal of Mathematical Physics, vol. 42, Issue 1, Jan. 2001, 19 pages.

Shor, Peter, "Capacities of Quantum Channels and How to Find Them," Mathematical Programming, vol. 97, Apr. 2003, 26 pages.

Wei, Shi-Jie, et al., "Efficient universal quantum channel simulation in IBM's cloud quantum computer," Science China Physics, Mechanics and Astronomy, vol. 61, Issue 7, Apr. 9, 2018, 13 pages.

* cited by examiner

QUANTUM PAYLOAD SERVICE FOR FACILITATING COMMUNICATIONS BETWEEN A QUANTUM COMPUTING SYSTEM AND CLASSICAL COMPUTING SYSTEMS

TECHNICAL FIELD

The examples relate generally to quantum computing systems, and in particular to a quantum payload service for facilitating communications between a quantum computing system and classical computing systems.

BACKGROUND

Quantum computing systems perform computations utilizing quantum-mechanical phenomena, such as superposition and entanglement. Unlike classical computing systems that process data encoded in binary bits, each of which is always in one of two definite states ("0" or "1"), quantum computing systems process data in units of quantum bits (qubits) that can be in superpositions of states. "Superposition" means that each qubit can represent both a "1" and a "0" at the same time. The qubits in a superposition can be correlated with each other (referred to as "entanglement"). That is, the state of a given qubit (whether it is a "1" or a "0") can depend on the state of another qubit. A quantum computing system with N qubits can be in a superposition of up to $2^N$ states simultaneously. Compared to the classical computing systems that can only be in one of these $2^N$ states at a particular time, quantum computing systems have higher computing power and may solve difficult problems that are intractable using the classical computing systems.

SUMMARY

The examples include a quantum payload service which is configured to receive a payload from a classical computing system via a classical computing connection such as a Hypertext Transfer Protocol (HTTP) connection. The quantum payload service communicates with a quantum channel router that communicates with a plurality of quantum channels and is configured to create active communication channels between two service endpoints for the transmission of quantum information (such as state, superposition and entanglement information) as well as classical information. The examples thus facilitate communications between a classical computing system and quantum services in a quantum computing system in a secure and lightweight manner.

In one example a method is provided. The method includes receiving, by a payload service in a quantum computing system that offers a plurality of different quantum services, a message from a classical computing system that is destined for a first quantum service. The message includes a header and a payload. The method further includes determining, from the header, an originator address and a destination quantum service identifier that identifies the first quantum service. The method further includes extracting, from the message, the payload, and sending the payload, the originator address and the destination quantum service identifier to a quantum channel router of the quantum computing system for delivery of the payload to the first quantum service.

In another example a quantum computing system is provided. The quantum computing system includes one or more memories, and one or more processor devices coupled to the one or more memories. The one or more processor devices are to receive, by a payload service, a message from a classical computing system that is destined for a first quantum service of a plurality of quantum services in the quantum computing system, the message including a header and a payload. The one or more processor devices are further to determine, from the header, an originator address and a destination quantum service identifier that identifies the first quantum service. The one or more processor devices are further to extract, from the message, the payload, and to send the payload, the originator address and the destination quantum service identifier to a quantum channel router of the quantum computing system for delivery of the payload to the first quantum service.

In another example a computer program product is provided. The computer program product is stored on a non-transitory computer-readable storage medium and includes instructions to cause one or more processor devices to receive, by a payload service in a quantum computing system, a message from a classical computing system that is destined for a first quantum service of a plurality of quantum services in the quantum computing system, the message including a header and a payload. The instructions further cause the one or more processor devices to determine, from the header, an originator address and a destination quantum service identifier that identifies the first quantum service. The instructions further cause the one or more processor devices to extract, from the message, the payload, and send the payload, the originator address and the destination quantum service identifier to a quantum channel router of the quantum computing system for delivery of the payload to the first quantum service.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Quantum computing is an emerging research field. There now exists a number of publicly available qubit machines against which the Open Source Community can write simulations. Currently, there are no formal software patterns, paradigms or informed architectures devised for Quantum computing systems.

Classical computing systems and classical networking involves the use of protocols to exchange information between two connected nodes, such as two classical computing systems, in a network. Such nodes could be any networking hardware (such as routers) or services. One of the most popular protocols for communicating on the internet is Hypertext Transfer Protocol (HTTP). Quantum computing has no defined protocol recommendation to date, and thus there are no standardized mechanisms for communicating between a classical computing system and a quantum computing system. The examples implement a quantum payload service for facilitating communications between a quantum computing system and classical computing systems.

The examples include a quantum payload service that is configured to receive a payload from a classical computing system via a classical computing connection such as an HTTP connection. The quantum payload service communicates with a quantum channel router that communicates with a plurality of quantum channels and is configured to create active communication channels between two service endpoints for the transmission of quantum information (such as state, superposition, and entanglement information) as well as classical information. The examples thus facilitate communications between a classical computing system and quantum services in a quantum computing system in a secure and lightweight manner. Quantum channels may use quantum principles, such as teleportation or entanglement principles, and thus can exist in a quantum environment while still being able to communicate with classical computing systems that exist in environments outside of the quantum computing environment. The quantum services may also generate messages that are to be communicated to the classical computing environment via the quantum channel router and the payload service, as further described below.

Figure 1A:
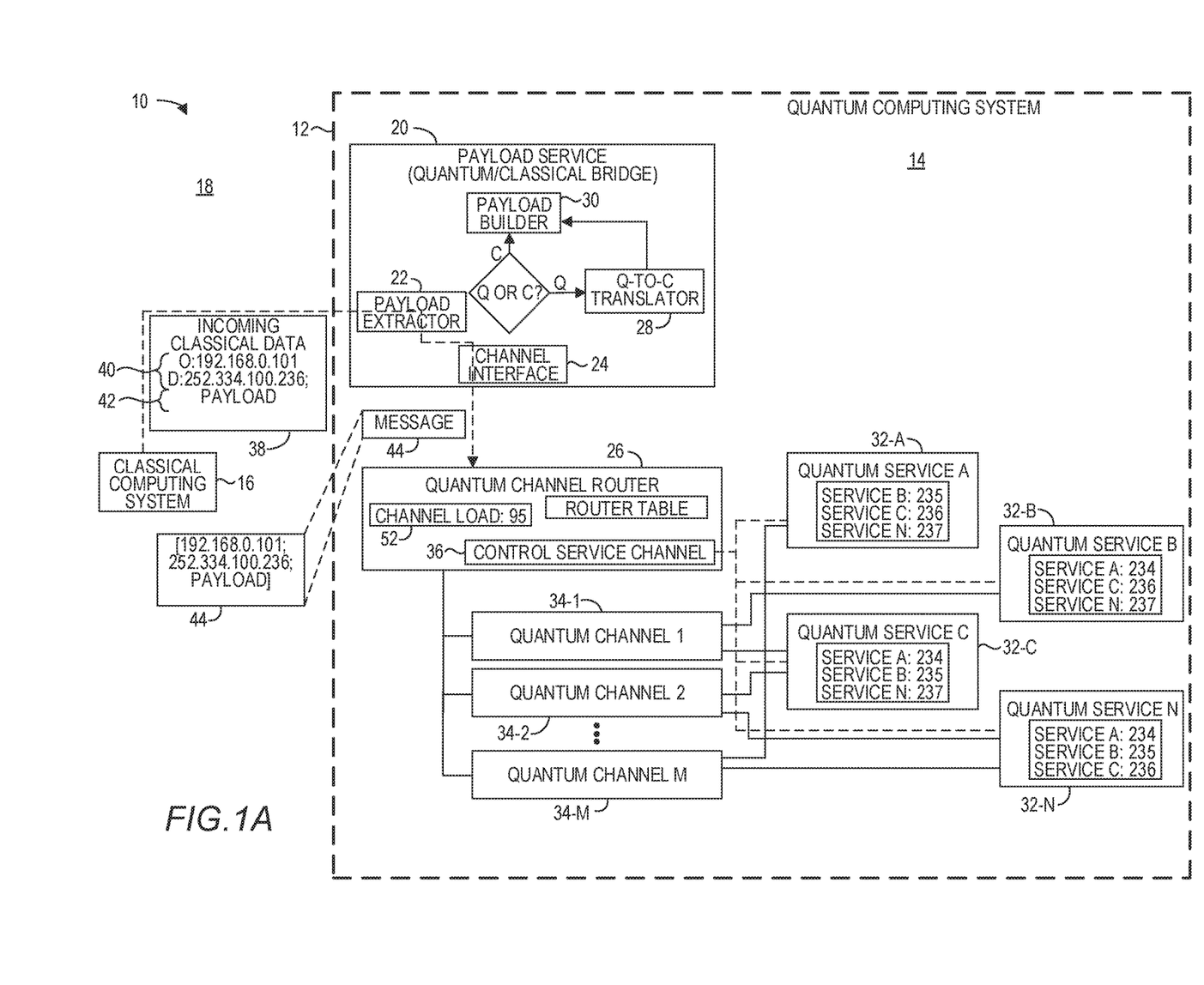
FIGS. 1A-1C are block diagrams illustrating an environment at three successive points in time in which examples may be practiced.
Figure 1B:
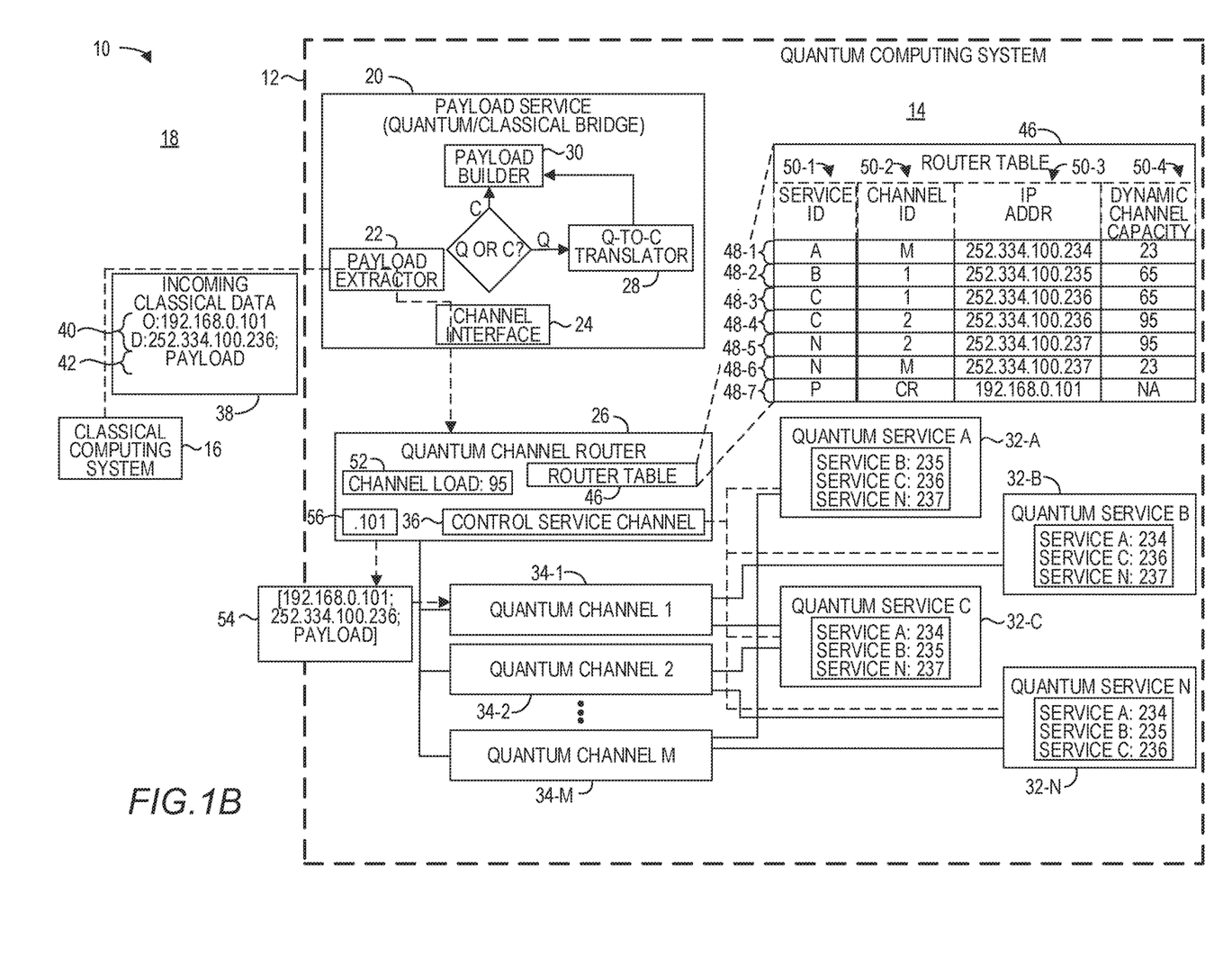
Figure 1C:
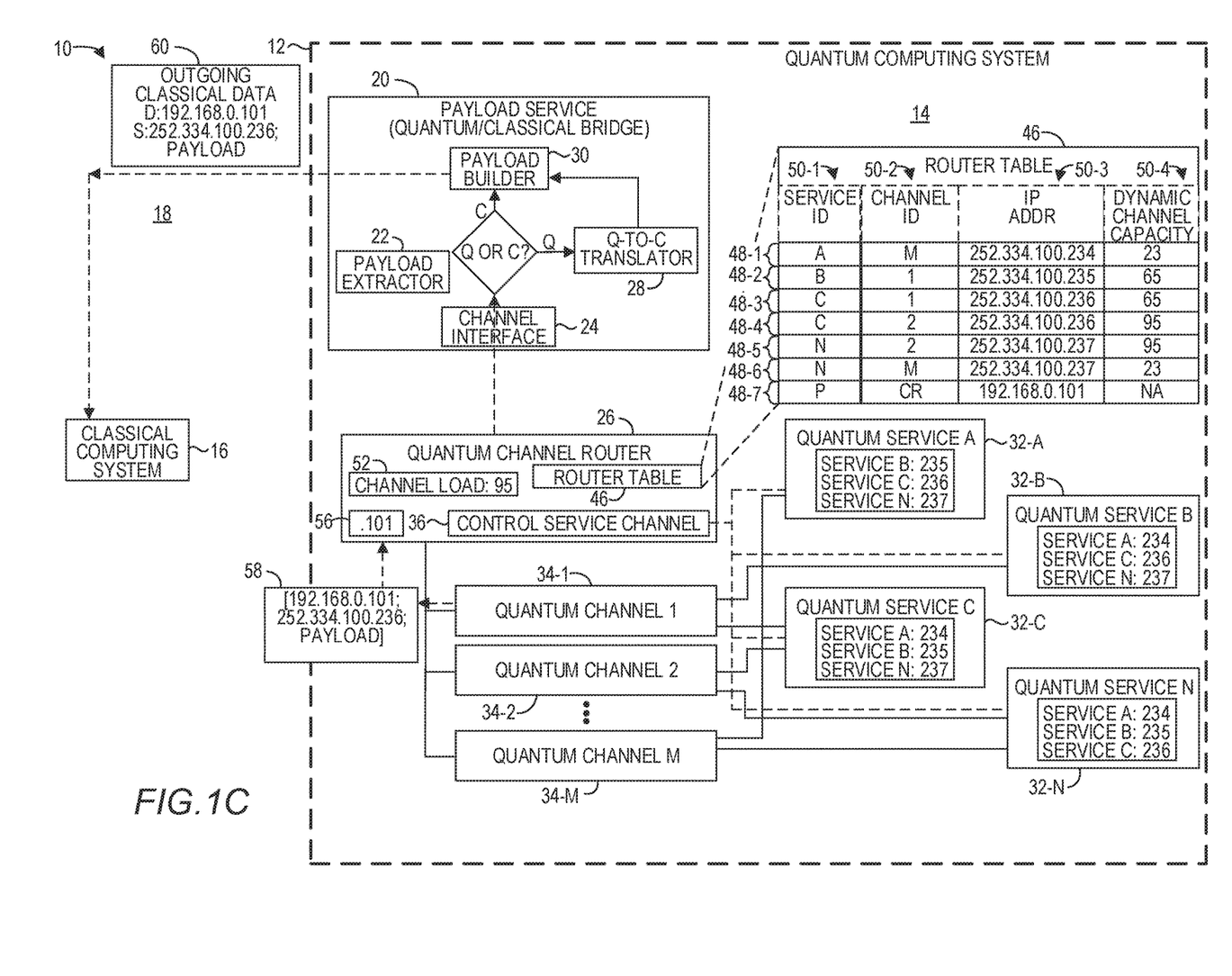

FIGS. 1A-1C are block diagrams illustrating an environment 10 at three successive points in time in which examples may be practiced. The environment 10 includes a quantum computing system 12 that operates in a quantum environment 14, and one or more classical computing systems 16 that operate in classical computing environments 18. The phrase "quantum environment" refers to computing systems that perform computations utilizing quantum-mechanical phenomena, such as superposition and entanglement. Such computing systems often operate under certain environmental conditions, such as at or near 0° Kelvin. The phrase "classical environment" refers to any computing conventional computing systems that operate using binary digits that have a value of either 1 or 0.

The quantum computing system 12 includes a payload service 20 that operates to provide a bridge between the quantum environment 14 and the classical computing environment 18, as discussed in greater detail below. The payload service 20 includes a payload extractor 22 that is configured to receive a message from the classical computing environment 18. The payload service 20 also includes a channel interface 24 that is configured to facilitate bi-directional communications between the payload service 20 and a quantum channel router 26. The payload service 20 includes a quantum-to-classical translator 28 that translates, or converts, quantum information in the form of qubits to binary classical information in the form of 1s and 0s. The payload service 20 includes a payload builder 30 that is configured to receive a message generated in the quantum computing system 12 and generate a suitably formatted message for transmission into the classical computing environment 18.

The quantum computing system 12 includes a plurality of quantum services 32-A, 32-B, 32-C, and 32-N (generally quantum services 32). While for purposes of illustration only four quantum services 32 are illustrated, the examples are not limited to any particular number of quantum services 32, and in practice, the quantum computing system 12 may have tens, hundreds or even thousands of quantum services 32. Each of the quantum services 32 is coupled to one or more quantum channels 34-1, 34-2, and 34-M (generally quantum channels 34). The quantum channels 34 are in turn, communicatively coupled to the quantum channel router 26.

The quantum channel router 26 includes, or in other examples is communicatively coupled to, a control service channel 36 on which service identifiers may be advertised by each quantum service 32, such that each quantum service 32 is aware of each other quantum service 32. Thus, the quantum services 32 are also communicatively coupled to the control service channel 36.

For purposes of illustration, assume that the classical computing system 16 sends a message 38 toward the quantum computing system 12. The message 38 is in a classical computing environment 18 format, and in particular utilizes an HTTP protocol format. The message 38 includes a header 40 and a payload 42. The header 40 identifies the originator IP address, in this example "192.168.0.101", and a destination address, in this example "252.334.100.236", of a quantum service 32 to which the message 38 is destined. The payload extractor 22 of the payload service 20 receives the message 38, extracts the header 40, and determines the originator address and a destination quantum service identifier that identifies the quantum service 32 to which the message 38 is destined. In this example, the destination quantum service identifier is the destination IP address in the header 40; although in other examples, the destination quantum service 32 may be identified by other data in one or more other fields of the header 40. The payload extractor 22 extracts, from the message 38, the payload 42 and sends the payload 42, the originator address, and the destination quantum service identifier in a message 44 to the quantum channel router 26 via the channel interface 24.

Referring now to FIG. 1B, the quantum channel router 26 receives the message 44 that includes the payload, the originator address and the destination quantum service identifier from the payload service 20. The quantum channel router 26 accesses a router table 46 to determine the quantum channel 34 associated with the quantum service 32 identified by the destination quantum service identifier.

The router table 46 contains information that describes a current state of various components in the quantum computing system 12. In this example, and at this point in time, the router table 46 includes a plurality of rows 48-1-48-6. The row 48-7 will be subsequently added, as discussed below. The rows 48-1-48-7 may be generally referred to herein as rows 48. Each row 48 contains four data fields, illustrated in columns 50-1-50-4 of the router table 46. The data in column 50-1 identifies the particular quantum service 32 that is associated with that row 48. The data in column 50-2 identifies a particular quantum channel 34 that is associated with that row 48. The data in column 50-3 identifies the destination quantum service identifier associated with the particular quantum service 32 associated with that row 48. The data in column 50-4 identifies a current channel capacity of the channel to which the quantum service 32 associated with that row 48 listens.

As an example, with regard to the row 48-1, the data in column 50-1 indicates that the row 48-1 is associated with the quantum service 32-A. The data in column 50-2 indicates that the quantum service 32-A is listening to the quantum channel 34-M. The data in column 50-3 indicates that the quantum service 32-A has a destination quantum service identifier of 252.334.100.234. The data in column 50-4 indicates that a current channel capacity of the quantum channel 34-M is 23%.

As one more example, with regard to the row 48-2, the data in column 50-1 indicates that the row 48-2 is associated with the quantum service 32-B, and the data in column 50-2 indicates that the quantum service 32-B is listening to the quantum channel 34-1. The data in column 50-3 indicates that the quantum service 32-B has a destination quantum service identifier of 252.334.100.235. The data in column 50-4 indicates that a current channel capacity of the quantum channel 34-1 is 65%.

In some examples, as a quantum service 32 initiates, the respective quantum service 32 determines one or more quantum channels 34 on which to listen for messages destined for the respective quantum service 32. The quantum service 32 may register with the quantum channel router 26 for each such quantum channel 34. Upon registration, the quantum channel router 26 generates a corresponding row 48 in the router table 46. As an example, the quantum service 32-C may initiate and register with the quantum channel router 26 indicating that the quantum service 32-C will listen to the quantum channel 34-1. The quantum service 32-C also provides, as part of the registration, the destination quantum service identifier of the quantum service 32-C, in this example, 252.334.100.236. In response, the quantum channel router 26 generates the row 48-3 in the router table 46. The quantum service 32-C also registers with the quantum channel router 26 to listen to the quantum channel 34-2. In response, the quantum channel router 26 generates the row 48-4 in the router table 46. In this manner, the quantum channel router 26 is aware of each quantum service 32 and the particular quantum channels 34 to which the quantum service 32 is listening, and the destination quantum service identifier of the quantum service 32.

As discussed above, upon receipt of the message 44, the quantum channel router 26 accesses the router table 46 to determine the quantum channel 34 associated with the quantum service 32 identified by the destination quantum service identifier. In this example, the destination quantum service identifier identifies the quantum service 32-C. The quantum channel router 26 determines that the rows 48-3 and 48-4 of the router table 46 are associated with the quantum service 32-C based on the data in column 50-1. The row 48-3 indicates that the quantum service 32-C is listening to the quantum channel 34-1. The row 48-4 indicates that the quantum service 32-C is also listening to the quantum channel 34-2.

The quantum channel router 26 accesses a threshold channel load 52 that identifies a maximum channel capacity of a quantum channel 34. With regard to the quantum channel 34-2, the quantum channel router 26 accesses the channel capacity data in the column 50-4 of the row 48-4 and determines that the channel capacity is equal to the threshold channel load 52, in this example, 95, and thus that at the current point in time the quantum channel 34-2 is at maximum capacity and cannot process additional messages. The quantum channel router 26 accesses the channel capacity data in the column 50-4 of the row 48-3, and determines that the channel capacity, in this example 65, is below the threshold channel load 52. The quantum channel router 26 then generates a quantum service message 54 that includes the payload, the originator address, and an identifier that identifies the quantum service 32-C. In this example, the identifier that identifies the quantum service 32-C is the internet protocol (IP) address associated with the quantum service 32-C. However, in other examples, any suitable unique identifier may be used. The quantum channel router 26 sends the quantum service message 54 to the quantum service 32-C via the quantum channel 34-1.

Because the message 44 was received from the payload extractor 22, the quantum channel router 26 is aware that the message 44 originated in the classical computing environment 18. Based on this determination, the quantum channel router 26 generates a row 48-7 in the router table 46, which corresponds to the originator address (192.168.0.101) of the message 44. In particular, the row 48-7 identifies the payload service 20 ("P") as the service associated with the originator address. The row 48-7 identifies the quantum channel router 26 ("CR") as the channel identifier associated with the originator address. The row 48-7 also identifies the originator address. If the quantum computing system 12 had previously received messages from the same originator address, the row 48-7 may have already existed in the router table 46.

The quantum channel router 26 may also insert the originator IP address in a listening table 56. The listening table 56 identifies those external originator addresses that exist outside of the quantum computing system 12 and which the quantum channel router 26 may service differently than internal messages transferred between quantum services 32.

The quantum service 32-C listens on the quantum channels 34-1 and 34-2. In some examples, such as in a publish/subscribe message communication protocol, each of the quantum services 32 may publish its respective destination quantum service identifier to the quantum channels 34 to which the respective quantum service 32 listens, such that only messages having the respective destination quantum service identifier as the destination address are delivered to the quantum service 32. In other examples, the quantum service 32-C may detect each message placed on the quantum channel 34-1, analyze the quantum service identifier of the message, and for those messages destined for the quantum service 32-C, access and process such messages. In this example, the quantum service 32-C receives the quantum service message 54 that was placed on the quantum channel 34-1 by the quantum channel router 26.

Referring now to FIG. 1C, the quantum service 32-C processes the quantum service message 54 and generates a reply message 58. The quantum service 32-C transmits onto the quantum channel 34-1 the reply message 58. The reply message 58 identifies the originator address of the message 38 as the destination address of the reply message 58. The quantum channel router 26 receives the reply message 58. The quantum channel router 26 accesses the router table 46. The quantum channel router 26 determines that the row 48-7 corresponds to the destination address in the reply message 58. Based on the row 48-7, the quantum channel router 26 determines that the reply message 58 should be sent to the payload service 20. The quantum channel router 26 sends the reply message 58 to the payload service 20.

The payload service 20 receives the reply message 58 from the quantum channel router 26. The payload service 20 determines whether the payload of the reply message 58 is in a classical bit format, and is thus ready for transmission to the classical computing environment 18, or is in a qubit format, and thus should be first translated from the qubit format to the classical computing format by the quantum-to-classical translator 28. In this example, the reply message 58 is in a classical bit format, and a payload builder 30 of the payload service 20 generates an HTTP header that includes the destination address from the reply message 58. The payload builder 30 generates a new message 60 that includes the HTTP header and the reply message 58 and sends the message 60 to the destination address. In this manner, the payload service 20 facilitates communications between the quantum computing system 12 and the classical computing system 16.

Figure 2:
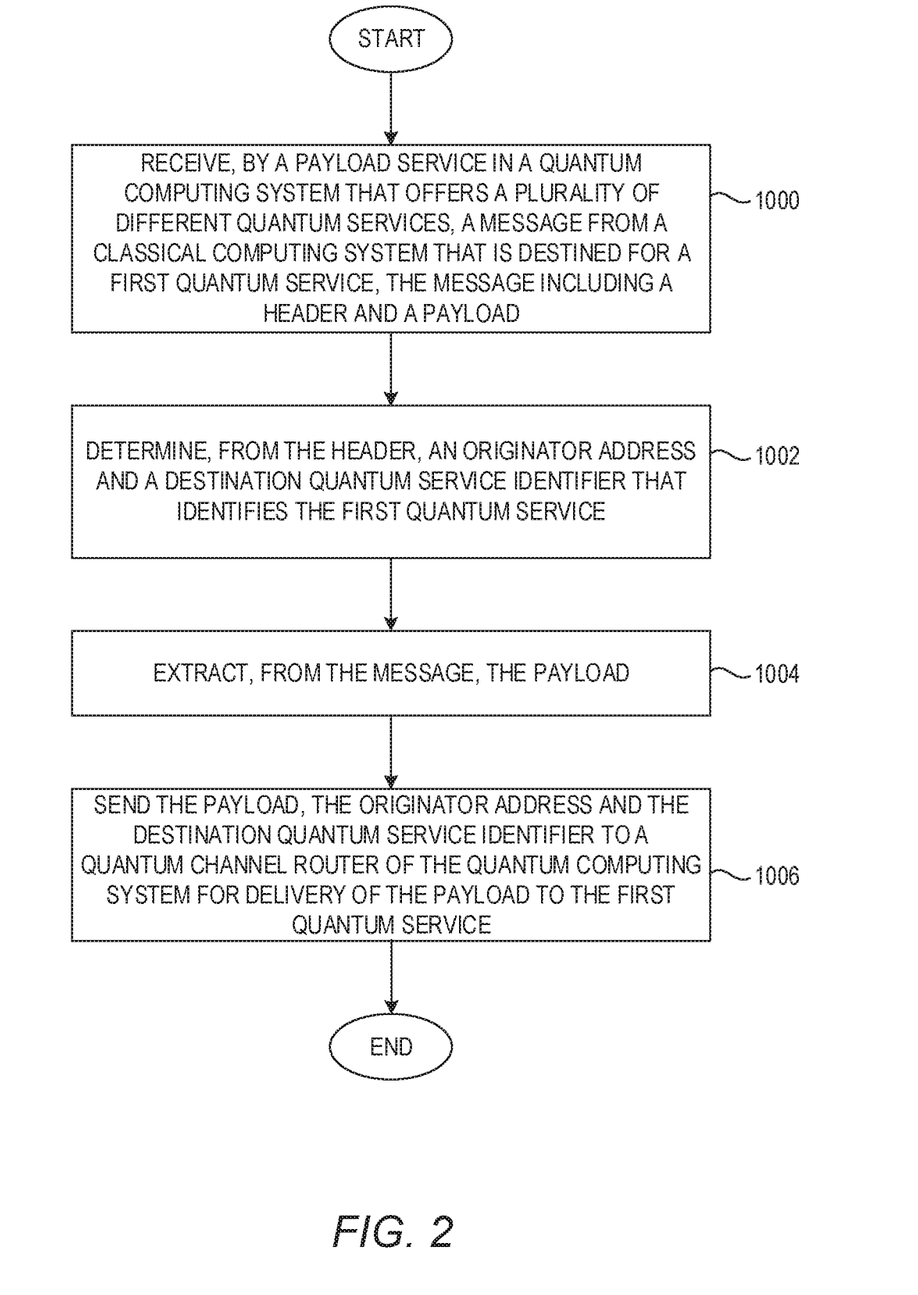
FIG. 2 is a flowchart of a method for facilitating communications between a quantum computing system and a classical computing system according to some examples.

FIG. 2 is a flowchart of a method for facilitating communications between a quantum computing system and a classical computing system according to some examples. FIG. 2 will be discussed in conjunction with FIGS. 1A-1C. The payload service 20 receives the message 38 from the classical computing system 16. The message 38 includes the header 40 and the payload 42 (FIG. 2, block 1000). The payload service 20 determines, from the header 40, the originator address and the destination quantum service identifier that identifies the quantum service 32-C (FIG. 2, block 1002). The payload service 20 extracts, from the message 38, the payload 42. (FIG. 2, block 1004). The payload service 20 sends the payload 42, the originator address, and the destination quantum service identifier to the quantum channel router 26 for delivery of the payload 42 to the quantum service 32-C (FIG. 2, block 1006).

Figure 3:
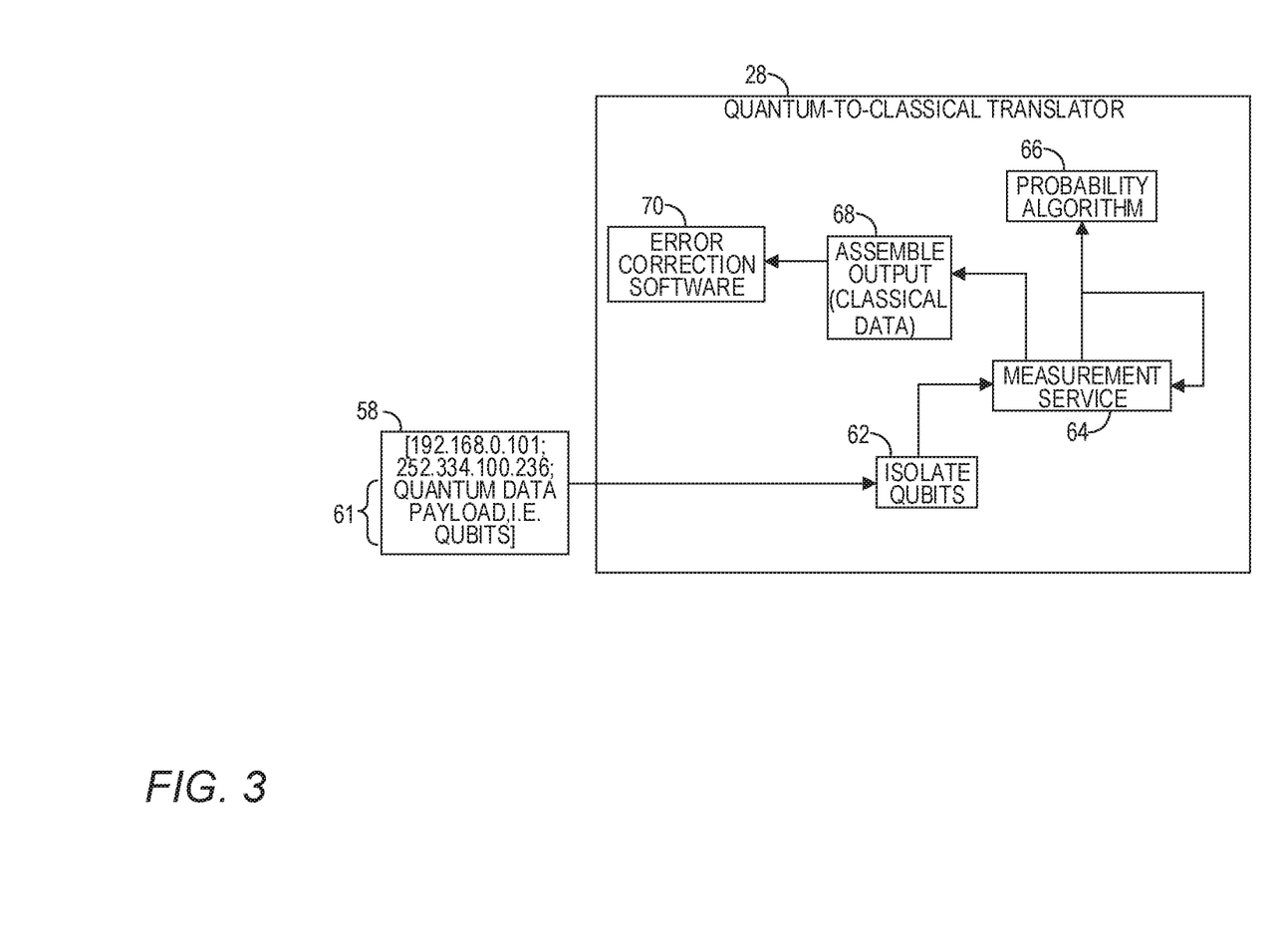
FIG. 3 is a block diagram that illustrates a quantum-to-classical translator according to one example.

FIG. 3 is a block diagram that illustrates the quantum-to-classical translator 28 according to one example. Prior to discussing FIG. 3 it may be beneficial to discuss aspects of a quantum computing environment in general. In a quantum computing environment, a primary difference between a classical bit and a qubit is superposition. A qubit can have a state of 1 and 0 simultaneously. In contrast, in the classical computing environment 18, a bit is binary and can have a value of only 1 or 0. A qubit can be represented as a sphere, with 1 and 0 on the North and South poles, and the actual state somewhere in between, or can be a linear combination of the states. A qubit has no equivalent in classical computing, and transferring the actual qubit to a classical computing environment is not feasible due to a difference in existing ambient temperatures, with qubits existing at a milli-Kelvin temperature.

When a measurement of a qubit is taken in the quantum environment 14, the measurement collapses to a classical state of 1 or 0, with the proximity to the appropriate pole (i.e., the Z axis) dictating whether the state is 1 or 0. The measurement of a qubit in a superposition state appears random due to this, as it is a probability check: the outcome is sometimes 0 and sometimes 1. Accordingly the measurement should be repeated multiple times to determine the likelihood of a qubit being in a particular state.

This is probabilistic in nature, so a multiple measurement process increases the likelihood of the state being accurate. To improve overall accuracy, classical error correction, such as a CRC check or a checksum, may be used to infer the state of the data.

An act of measurement of a qubit can result in the collapse of the quantum state, which is catastrophic for entanglement (decoherence). At a hardware level, a solution is to weakly couple each qubit to a microwave resonator whose resonance characteristics depend on the state of the qubit. Once the qubit operations are completed, the qubits may be measured by sending a microwave tone to their resonators and analyzing the signal it reflects back. The phase and amplitude of this reflected signal will be different depending on the qubit state.

For purposes of illustration, assume that the reply message 58 (FIG. 1C) had a payload in qubits rather than in the classical binary format. Referring now to FIG. 3, the quantum-to-classical translator 28 receives the reply message 58 which, in this example, has a quantum data payload 61 comprising a plurality of qubits. At functional block 62, the quantum-to-classical translator 28 isolates one qubit at a time. Each qubit is passed to a measurement service 64. The measurement service 64 takes N measurements of the superposition state of the qubit, which will collapse down (weakly) to either a classical 1 or a 0. The greater the value of N, in other words, the greater number of measurements taken, the higher the probability of arriving at the true state of 1 or 0. A probability algorithm 66, which has a threshold for acceptable errors, controls how many times (N) the measurement will occur. The probability algorithm 66 determines when the threshold is reached. Until the threshold is reached, the measurement service 64 repeatedly takes measurements. After the threshold is reached, at block 68 the quantum-to-classical translator 28 assembles the non-superposition bits in the proper order. This process occurs multiple times, once for each qubit in the quantum data payload 61. Because the assembled data may not be at 100% accuracy, at block 70, the quantum-to-classical translator 28 implements error correction software to arrive at one hundred percent accuracy.

Figure 4A:
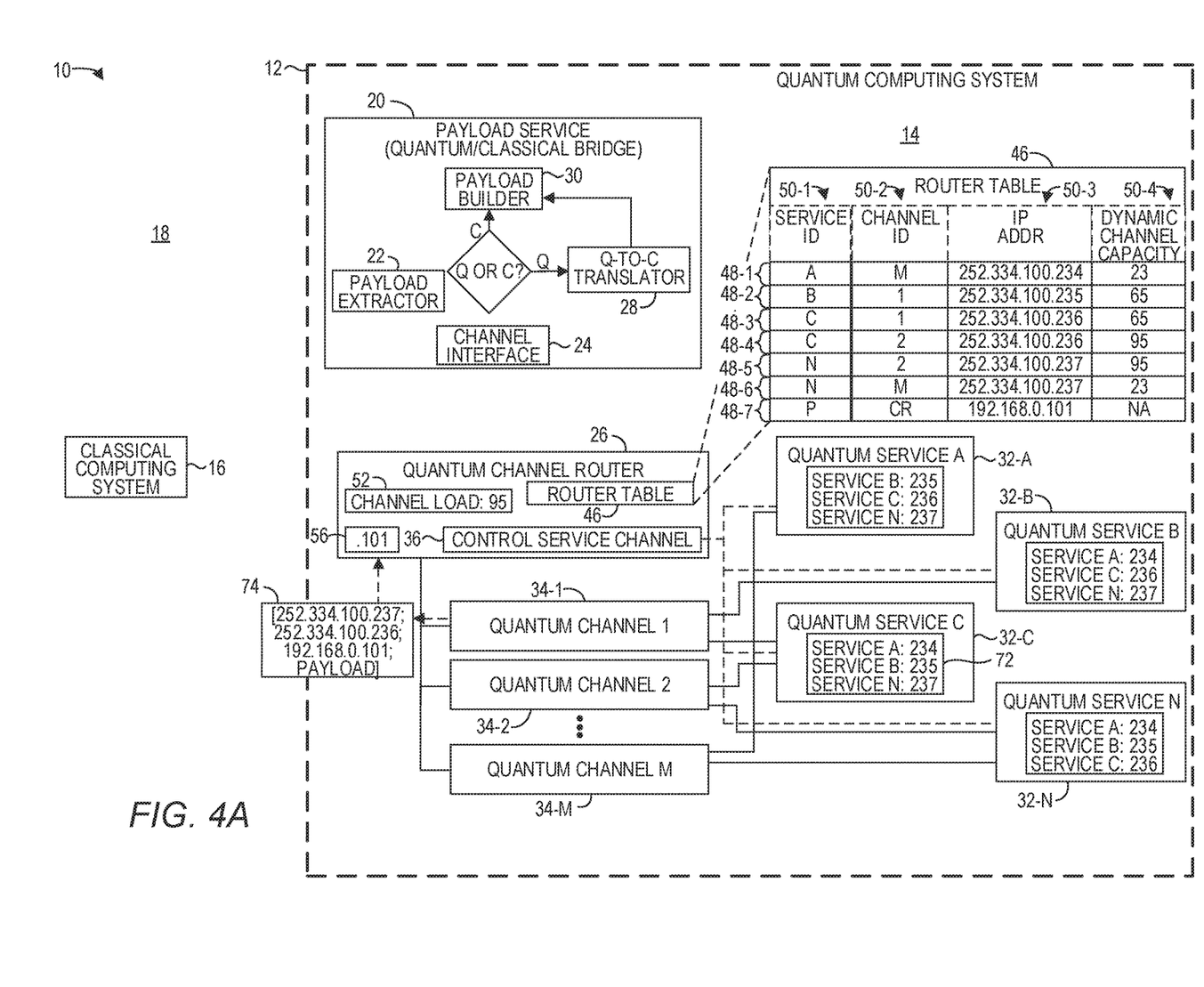
FIGS. 4A-4C are block diagrams illustrating aspects of internal routing of messages from one quantum service to another quantum service according to one example.
Figure 4B:
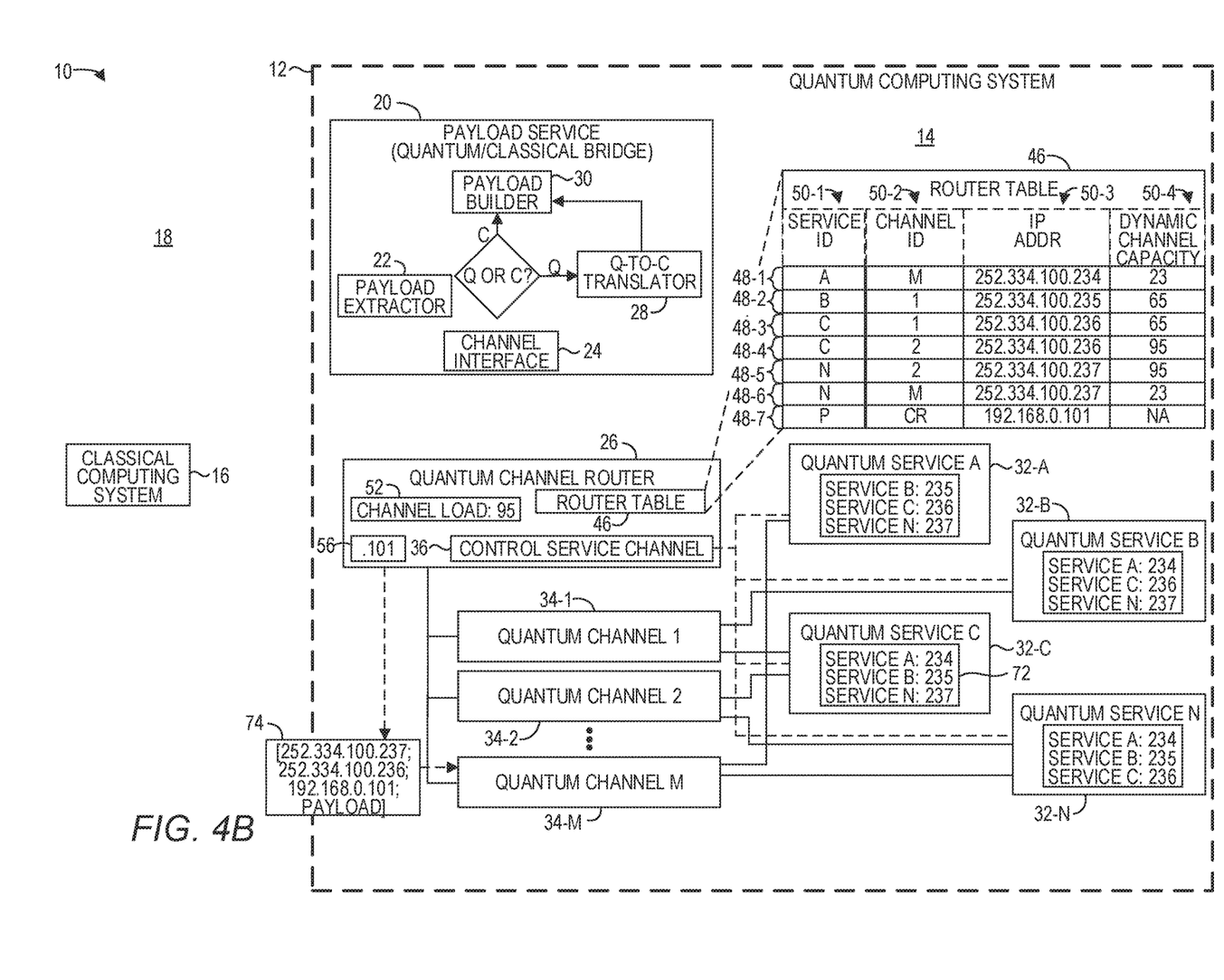
Figure 4C:
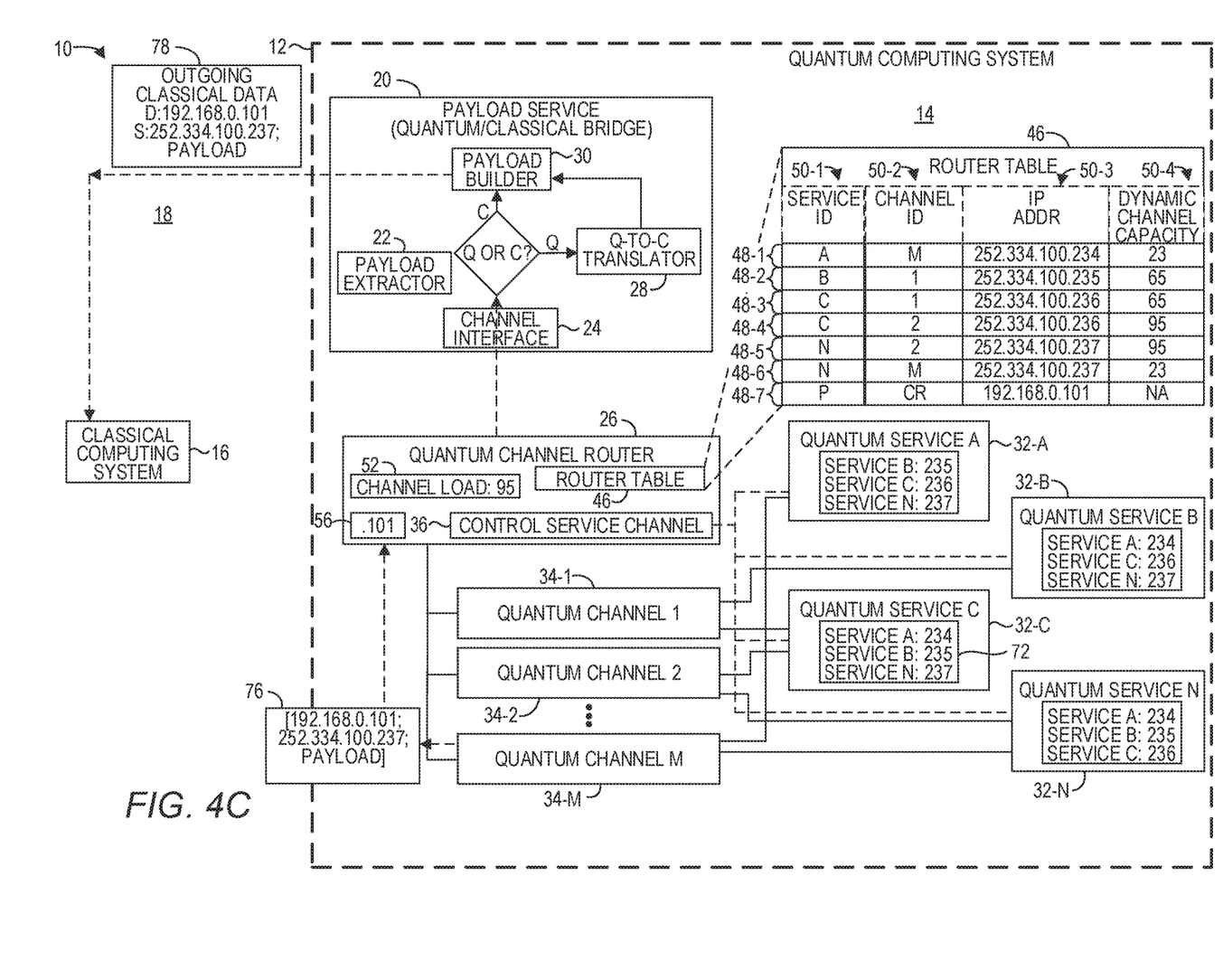

FIGS. 4A-4C illustrate an aspect of internal routing of messages from one quantum service 32 to another quantum service 32, according to one example. Referring briefly first to FIG. 1C, in that example, the quantum service 32-C generated a reply message 58 that was destined for the originator address in the classical computing environment 18. In the example illustrated in FIG. 4A, it will be assumed that instead of generating the reply message 58 with the destination being that of the originator address in the classical computing system 16, the quantum service 32-C, based on the payload in the quantum service message 54 (FIG. 1B), determines that the quantum service 32-C should send the message 54 to the quantum service 32-N for further processing. The quantum service 32-C accesses a quantum service table 72 and determines the quantum service destination address of the quantum service 32-N. In some examples, the quantum service 32-C generates the quantum service table 72 based on messages received on the control service service channel 36 that identify a quantum service 32 and the quantum service destination address of the respective quantum service 32. Similarly, periodically, the quantum service 32-C publishes on the control service channel 36 the identifier of the quantum service 32-C and the quantum service destination address of the quantum service 32-C so that other quantum services 32 can similarly become aware of the quantum service destination address of the quantum service 32-C.

The quantum service 32-C generates a quantum message 74 that includes the quantum service destination address of the quantum service 32-N, the originator IP address, and a payload. The payload may be in classical binary format or in quantum format. The quantum service 32-C, in this example, transmits the quantum message 74 onto the quantum channel 34-1. The quantum channel router 26 receives the quantum message 74 and determines, based on the destination IP address, that the quantum message 74 is to be internally routed to another quantum service 32-N. The quantum channel router 26 accesses the router table 46 and determines that the identified quantum service 32-N listens to quantum channels 34-2 and 34-M.

Referring now to FIG. 4B, the quantum channel router 26 determines, based on the row 48-5 of the router table 46, that the quantum channel 34-2 has a channel capacity of 95, and thus cannot accept any additional messages at this time. The quantum channel router 26 determines, based on the row 48-6, that the quantum channel 34-M has a channel capacity of 23 and is thus below the channel load threshold. The quantum channel router 26 sends the quantum message 74 to the quantum service 32-N via the quantum channel 34-M.

Referring now to FIG. 4C, the quantum service 32-N receives the quantum message 74, performs additional processing based on the payload in the quantum message 74, and generates a message 76 that identifies the originator address as the destination address. The quantum service 32-N transmits the message 76 onto the quantum channel 34-M. The quantum channel router 26 receives the message 76 and determines, based on the destination IP address, that the destination is outside of the quantum computing system 12. The quantum channel router 26 provides the message to the payload service 20. The payload builder 30 generates a message 78 having an HTTP header and a payload in a classical binary bit format, and sends the message 78 to the classical computing system 16.

Figure 5:
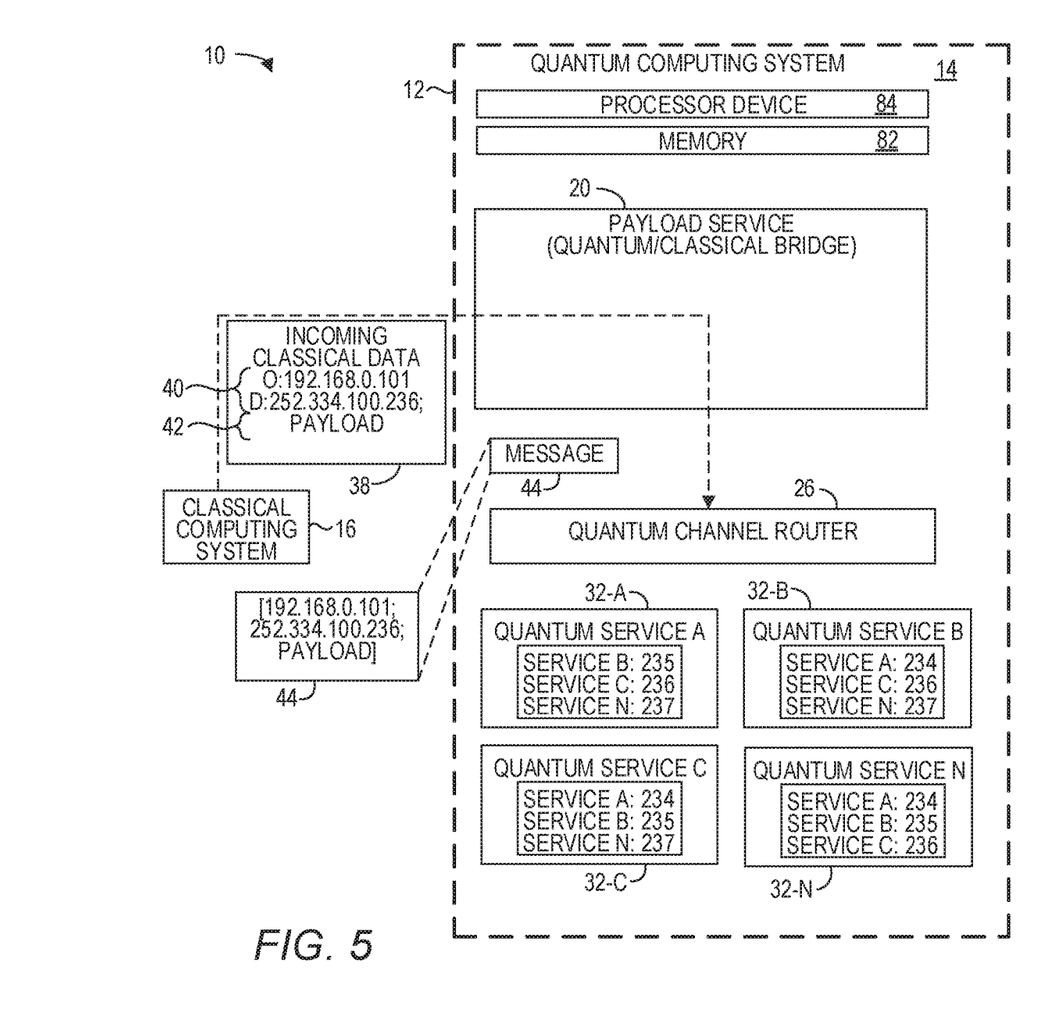
FIG. 5 is a simplified block diagram of the quantum computing system illustrated in FIGS. 1A-1C according to another example.

FIG. 5 is a simplified block diagram of the quantum computing system 12 illustrated in FIGS. 1A-1C, according to another example. The quantum computing system 12 includes one or more memories 82 and one or more processor devices 84 coupled to the one or more memories 82. The payload service 20, quantum channel router 26 and quantum services 32 may each be implemented with a separate processor device 84 and memory 82, or, one or more of the payload service 20, the quantum channel router 26 and the quantum services 32 may share a processor device 84 and memory 82. The payload service 20, quantum channel router 26 and quantum services 32 may operate in a temperature controlled environment at or near 0° Kelvin. The one or more processor devices 84 are to receive, by the payload service 20, the message 38 from the classical computing system 16 that is destined for the first quantum service 32-C of the plurality of quantum services 32-A-32-N. The message 38 includes the header 40 and the payload 42. The payload service 20 determines, from the header 40, the originator address and the quantum service identifier that identifies the first quantum service 32-C. The payload service 20 extracts, from the message 38, the payload 42. The payload service 20 sends the payload 42, the originator address and the destination quantum service identifier to the quantum channel router 26 for delivery of the payload 42 to the first quantum service 32-C.

Figure 6:
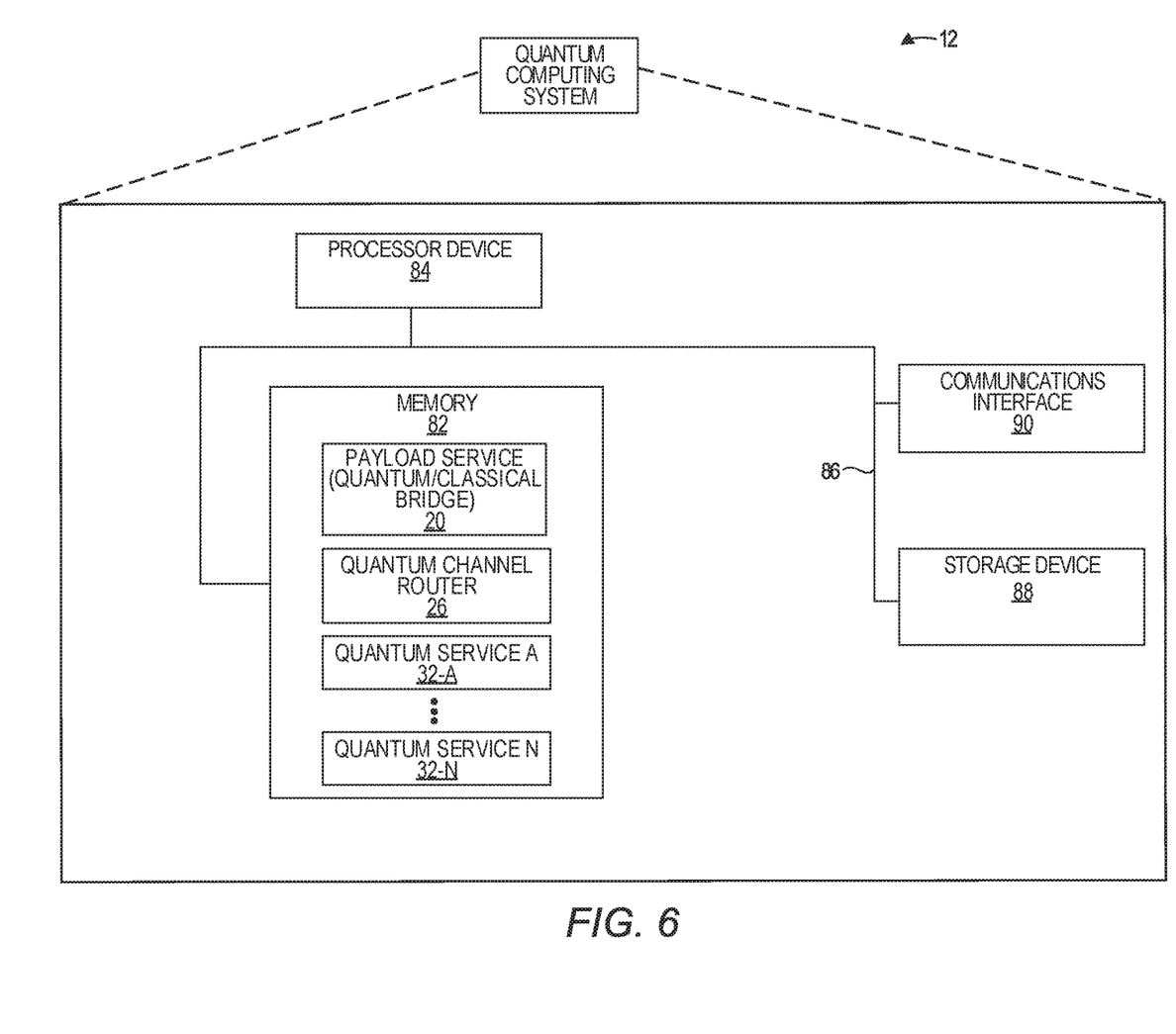
FIG. 6 is a block diagram of a quantum computing system suitable for implementing examples.

FIG. 6 is a block diagram of the quantum computing system 12 suitable for implementing examples according to one example. The quantum computing system 12 may comprise any computing or electronic device capable of including firmware, hardware, and/or executing software instructions to implement the functionality described herein in a quantum environment. The quantum computing system 12 includes the one or more processor devices 84, the one or more memories 82, and a system bus 86. The system bus 86 provides an interface for system components including, but not limited to, the one or more memories 82 and the one or more processor devices 84. The processor device 84 can be any commercially available or proprietary processor suitable for operating in a quantum environment. The quantum computing system 12 may further include or be coupled to a non-transitory computer-readable storage medium such as a storage device 88. The storage device 88 and other drives associated with computer-readable media and computer-usable media may provide non-volatile storage of data, data structures, computer-executable instructions, and the like.

A number of modules can be stored in the storage device 88 and in the memory 82, including the payload service 20, the quantum channel router 26, and the quantum services 32-A-32-N. All or a portion of the examples may be implemented as a computer program product stored on a transitory or non-transitory computer-usable or computer-readable storage medium, such as the storage device 88, which includes complex programming instructions, such as complex computer-readable program code, to cause the one or more processor devices 84 to carry out the steps described herein. Thus, the computer-readable program code can comprise software instructions for implementing the functionality of the examples described herein when executed on the one or more processor devices 84.

The quantum computing system 12 may also include a communications interface 90, such as, by way of non-limiting example, an Ethernet transceiver, suitable for communicating with the classical computing system 16 in the classical computing environment 18.

Individuals will recognize improvements and modifications to the preferred examples of the disclosure. All such improvements and modifications are considered within the scope of the concepts disclosed herein and the claims that follow.

What is claimed is:

1. A method comprising:
  receiving, by a payload service in a quantum computing system that offers a plurality of different quantum services, a message from a classical computing system that is destined for a first quantum service, the message including a header and a payload;
  determining, from the header, an originator address and a destination quantum service identifier that identifies the first quantum service;
  extracting, from the message, the payload;
  sending the payload, the originator address and the destination quantum service identifier to a quantum channel router of the quantum computing system for delivery of the payload to the first quantum service;
  receiving, by the quantum channel router, the payload, the originator address and the destination quantum service identifier from the payload service;

accessing, by the quantum channel router, a router table to identify, based on the destination quantum service identifier, a first quantum channel of a plurality of different quantum channels, wherein the router table identifies the first quantum service and a second quantum service as being capable of receiving payloads via the first quantum channel and wherein the quantum channel router is configured to communicate both classical and quantum information with the plurality of different quantum services via the plurality of different quantum channels; and sending, by the quantum channel router, the payload, the originator address, and an identifier that identifies the first quantum service to the first quantum service via the first quantum channel.

2. The method of claim 1 further comprising:
prior to sending the payload, determining that a current channel load of the first quantum channel is below a threshold channel load.

3. The method of claim 2 wherein sending the payload, the originator address, and the identifier that identifies first quantum service to the first quantum service via the first quantum channel comprises generating a first quantum service message comprising information that identifies the first quantum service, the originator address, and the payload, and further comprising:
sending the first quantum service message on the first quantum channel associated with the first quantum service.

4. The method of claim 3 further comprising:
listening, by the first quantum service, on the first quantum channel;
detecting, by the first quantum service, the information that identifies the first quantum service; and
in response to detecting the information that identifies the first quantum service, accessing the first quantum service message.

5. The method of claim 1 further comprising:
generating, by the first quantum service, a reply message; and
transmitting, on the first quantum channel, the reply message, the reply message identifying the originator address as a destination address of the reply message.

6. The method of claim 5, further comprising:
receiving, by the quantum channel router, the reply message;
determining, by the quantum channel router, that the destination address is an address outside of the quantum computing system; and
in response to determining that the destination address is an address outside of the quantum computing system, sending the reply message to the payload service.

7. The method of claim 6 further comprising:
receiving, by the payload service, the reply message from the channel router;
determining the destination address;
generating a Hypertext Transfer Protocol (HTTP) header that includes the destination address;
generating a new message that includes the HTTP header and the reply message; and
sending the new message to the destination address.

8. The method of claim 7 further comprising:
determining, by the payload service, that the reply message comprises a plurality of qubits; and
converting the plurality of qubits into a plurality of classical bits, each of which has a value of one or zero; and wherein the reply message comprises the plurality of classical bits.

9. The method of claim 1 further comprising:
receiving, by the quantum channel router, a first quantum message from the first quantum service;
determining that the first quantum message is destined for the second quantum service;
accessing, by the quantum channel router, the router table to determine a channel to which the second quantum service listens; and
sending the first quantum message to the second quantum service via the channel.

10. The method of claim 9 further comprising:
receiving, by the quantum channel router, a second quantum message from the second quantum service, the second quantum message comprising the originator address from the classical computing system outside of the quantum computing system;
determining that the originator address is outside of the quantum computing system; and
in response to determining that the originator address is outside of the quantum computing system, sending the second quantum message to the payload service.

11. The method of claim 1, further comprising:
receiving, by the first quantum service, from a control service channel, a plurality of quantum service identifiers that correspond to corresponding quantum services; and
storing, by the first quantum service, the plurality of quantum service identifiers for subsequent use in forwarding messages to one or more of the corresponding quantum services.

12. The method of claim 11 further comprising:
sending, by the first quantum service, a message comprising a quantum service identifier that identifies the first quantum service on the control service channel.

13. The method of claim 1 wherein the quantum computing system operates on quantum bits that exist in superposition.

14. A quantum computing system, comprising:
one or more memories; and
one or more processor devices coupled to the one or more memories to:
receive, by a payload service, a message from a classical computing system that is destined for a first quantum service of a plurality of quantum services in the quantum computing system, the message including a header and a payload;
determine, from the header, an originator address and a destination quantum service identifier that identifies the first quantum service;
extract, from the message, the payload;
send the payload, the originator address and the destination quantum service identifier to a quantum channel router of the quantum computing system for delivery of the payload to the first quantum service;
generate, by the quantum channel router, a first quantum service message that comprises information that identifies the first quantum service, the originator address, and the payload;
access, by the quantum channel router, a router table to identify, based on the destination quantum service identifier, a first quantum channel of a plurality of different quantum channels, wherein the quantum channel router is configured to communicate both classical and quantum information with the plurality of quantum services via the plurality of different quantum channels;

determine, by the quantum channel router, that a current channel load of the first quantum channel is below a threshold channel load; and in response to determining that the current channel load of the first quantum channel is below the threshold channel load, send, by the quantum channel router, the first quantum service message on the first quantum channel.

15. The quantum computing system of claim 14, wherein the one or more processor devices are further to:

receive, by the quantum channel router, a first quantum message from the first quantum service;

determine that the first quantum message is destined for a second quantum service;

access, by the quantum channel router, the router table to determine a channel to which the second quantum service listens; and send the first quantum message to the second quantum service via the channel.

16. The quantum computing system of claim 15, wherein the one or more processor devices are further to:

receive by the quantum channel router, a second quantum message from the second quantum service, the second quantum message comprising the originator address from the classical computing system outside of the quantum computing system;

determine that the originator address is outside of the quantum computing system; and in response to determining that the originator address is outside of the quantum computing system, send the second quantum message to the payload service.

17. The quantum computing system of claim 14, wherein the one or more processor devices are further to:

receive a reply message from the first quantum service;

determine that the reply message comprises a plurality of qubits;

convert the plurality of qubits in the reply message into a plurality of classical bits, each of which has a value of one or zero, to generate a classical bit reply message;

generate a Hypertext Transfer Protocol (HTTP) header that includes a destination address;

generate a new message that includes the HTTP header and the classical bit reply message; and send the new message to the destination address.

18. A computer program product stored on a non-transitory computer-readable storage medium and including instructions configured to cause one or more processor devices to:

receive, by a payload service in a quantum computing system, a message from a classical computing system that is destined for a first quantum service of a plurality of quantum services in the quantum computing system, the message including a header and a payload;

determine, from the header, an originator address and a destination quantum service identifier that identifies the first quantum service;

extract, from the message, the payload;

send the payload, the originator address and the destination quantum service identifier to a quantum channel router of the quantum computing system for delivery of the payload to the first quantum service via a first quantum channel of a plurality of different quantum channels, wherein the quantum channel router is configured to communicate both classical and quantum information with the plurality of quantum services via the plurality of different quantum channels;

receive a reply message from the first quantum service;

determine that the reply message comprises a plurality of qubits;

convert the plurality of qubits in the reply message into a plurality of classical bits, each of which has a value of one or zero, to generate a classical bit reply message;

generate a Hypertext Transfer Protocol (HTTP) header that includes a destination address, the destination address comprising the originator address;

generate a new message that includes the HTTP header and the classical bit reply message; and send the new message to the classical computing system via the destination address.

* * * * *